U̇nited States Patent [19]

Adams, Jr.

[11] 4,121,871
[45] Oct. 24, 1978

[54] WHEEL MOUNTING
[75] Inventor: Thomas Burton Adams, Jr., Moline, Ill.
[73] Assignee: Deere & Company, Moline, Ill.
[21] Appl. No.: 798,322
[22] Filed: May 19, 1977
[51] Int. Cl.² ............................................. B60B 27/02
[52] U.S. Cl. ............................... 301/105 R; 301/131; 308/191
[58] Field of Search .................. 301/109, 110, 105 R, 301/131, 132, 5.7; 308/191, 210

[56] References Cited
U.S. PATENT DOCUMENTS

| 687,672 | 11/1901 | Bray | 308/191 |
|---|---|---|---|
| 1,286,438 | 12/1918 | Smith | 301/105 R X |
| 2,304,944 | 12/1942 | Martinec | 308/191 X |
| 2,510,659 | 6/1950 | Riston | 308/191 |
| 2,616,770 | 11/1952 | McPherson | 308/191 |
| 2,622,930 | 12/1952 | Negri | 301/5.7 |
| 2,628,859 | 2/1953 | McCallen et al. | 295/49 |

Primary Examiner—Robert B. Reeves
Assistant Examiner—Charles A. Marmor

[57] ABSTRACT

A wheel mounting having a hub carried by a pair of axially spaced apart ball bearings carried on a spindle, the inner race rings of said bearings restrained against axial movement, and the outer race rings restrained against axial movement in opposite directions by hub carried snap rings. Elimination of hub shoulders previously required for positioning and restraining the outer race rings against axial movement caused by side loading reduces the casting and boring problems and facilitates simpler and more consistant assembly of the hub onto the spindle.

4 Claims, 2 Drawing Figures

WHEEL MOUNTING

BACKGROUND OF THE INVENTION

The present invention relates generally to wheel mountings and more particularly relates to means for positioning the anti-friction bearings which support a hub for rotation about a shaft.

Wheel hubs are commonly supported for rotation on a pair of spaced apart bearings which are subjected to radial and side loading forces during operation. Existing anti-friction ball bearings are well designed to withstand the radial loading forces. The side loading forces encountered by the wheel hubs and inner race rings of these bearings are typically resisted by confining the inner races with a shoulder on either the shaft or spindle and a spacer sleeve positioned between the adjacent surfaces of the inner races. The bearing outer race rings are typically restrained against side loading forces by hub shoulders which abut the outer rings at their adjacent edges or by restraining one bearing outer race ring against axial movement in either direction. This latter type of restraint usually includes a hub shoulder restraining one edge of the outer race ring and a washer or pressure ring coupled with the hub for restraining the other edge of that race ring.

Additional manufacturing, casting and boring expenses are required when such hub shoulders must be provided within a wheel hub. Further, assembly of the hub onto the spindle is less efficient where the hub has shoulders for positioning the bearings. Therefore it would be desirable to restrain the outer race rings without the use of such shoulders.

Positioning either one or both outer race rings adjacent a hub shoulder can cause reliability problems and increase assembly time and expense. Reliability of a hub bearing support would be reduced if the outer races and hub are not restrained or coupled so as to resist side loading forces. If, during assembly, a bearing outer race were positioned against a hub shoulder, and a sleeve spacer then mounted onto the spindle to separate the other bearing a defined distance from the first bearing, the second bearing outer race would not abut its respective hub shoulder if the sleeve were unknowingly long. Thus the assembler would not be aware that the second bearing outer race did not have axial restaint as expected and that the hub would be able to shift axially with respect to that bearing race. Therefore, slippage of the hub on the bearing may occur under side loading circumstances since the bearing outer race and hub were not coupled.

When a spacer sleeve is short, assembly time and cost may be increased because the bearing outer races will abut their respective hub shoulders but the inner races will not abut the spacer sleeve. Accordingly the bearing inner races would not be restrained although the outer races would be restrained by the hub shoulder. The assembler would not be aware that the inner race ring was not restrained by the sleeve. Thus, as the spindle nut was tightened to axially restrain the inner races, the second bearing inner race could be displaced axially from its outer race and if too great a pressure were exerted while tightening the nut, premature failure of the bearings could occur.

When only one outer race ring is restrained to counter side loading, only one hub shoulder is required and the other side of the outer race ring is restrained by a washer, collar or similar pressure ring. With this type of structure, the side loading forces are absorbed by one bearing outer race ring while the other bearing outer race ring encounters no side loading forces. If each bearing outer race absorbed some of the side loading forces, the expected life of that bearing would probably be greater then that of the bearing race which must resist all the side loading forces.

Some wheel mounting structures include tapered bearings upon which the hub rotates about the shaft. Since the tapered bearing tract within the inner race must be properly contoured so that the bearing will freely roll, excess tightening of the nut to restain the inner race rings can distort the tract. Thus the pressure used to confine this type of bearing is crucial and the bearing must be rechecked often to assure that it functions properly and that the nut has not worked loose.

SUMMARY OF THE INVENTION

To overcome these problems, the present invention provides a wheel mounting wherein a pair of ball bearings are carried by a spindle having the bearing inner race rings separated by a spacer sleeve, and held in place between an abutment on the spindle and an adjustable nut carried on the spindle, and the shoulder structure typically required on the hub to restrain the bearing outer race rings or hold them in position is eliminated. To hold the hub in place with respect to the bearing outer races, hub carried snap rings are provided. In this way the excessive casting and boring costs required to provide hub shoulders are eliminated.

Each outer race ring is confined by its respective snap ring against axial movement in one direction to resist the side loading forces. The snap rings are carried in hub grooves which are adjacent the outer portion of the hub. Restraint of the inner and outer bearing race rings during assembly is assured since undersize spacer sleeves are readily obvious prior to final installation of the last retaining ring, and since oversize spacer sleeves prevent insertion of the outside retaining ring into its groove. Thus the bearing inner races are positively restrained by properly sized sleeves during assembly and the outer races positioned adjacent their retaining ring restraint to assure side load resistance.

DESCRIPTION OF THE PREFERRED EMBODIMENT

Figure 2:
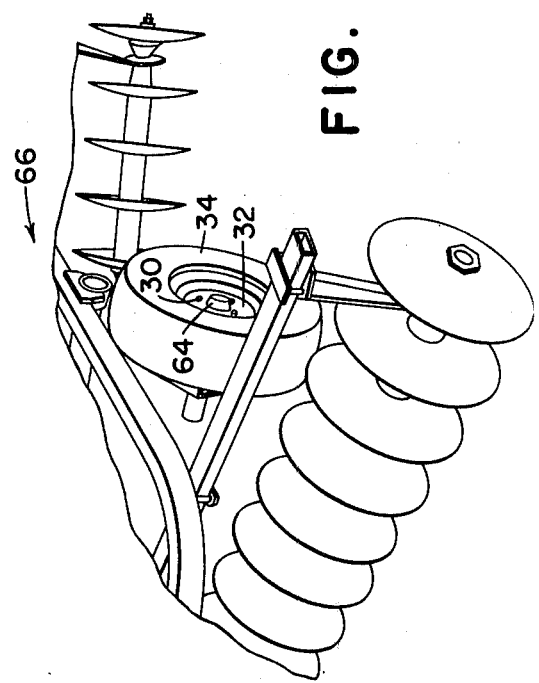
FIG. 2 is a perspective view of a disk harrow upon which the present invention is utilized to support the ground wheels.
Figure 1:
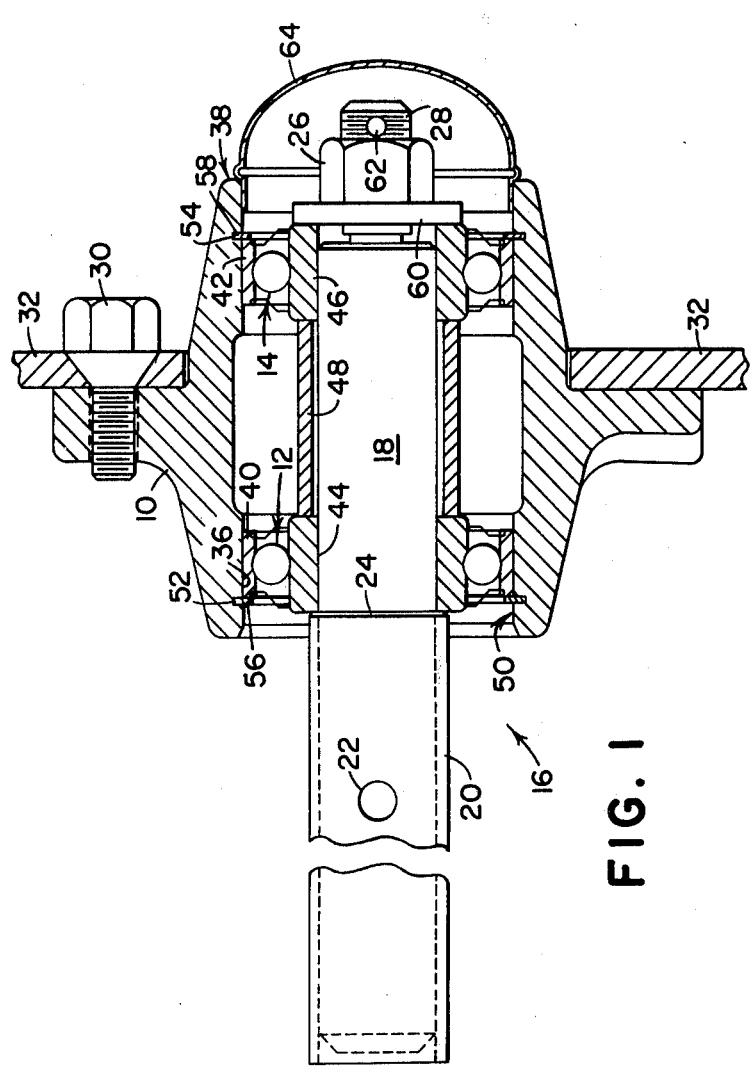
FIG. 1 is a cross sectional view of a wheel hub having the improved bearing positioning structure.

Referring now to FIG. 1, there is illustrated the wheel mounting upon which the transport wheel of the disk implement illustrated is FIG. 2 is carried. The wheel mounting includes a hub 10 which is carried on a pair of anti-friction ball bearings 12 and 14 that are in turn slidably carried on a spindle 16.

The spindle 16 is comprised of a shaft 18 having a sleeve 20 pinned thereto and welded at 22. The end of the sleeve 20 forms with the shaft 18 a vertical abutment surface at 24. The bearings 12 and 14 are mounted on the shaft 18 and a nut 26 is carried on the threaded end portion 28 of the spindle 16 to secure the bearings 12 and 14 on the shaft 18. Bolts 30 connect the rim 32 to the hub 10 for supporting a wheel 34 best shown in FIG. 2. The hub 10 has machined bearing supports 36 inwardly spaced from its edges 38 and, each support 36 is of constant diameter and of a diameter less than the remaining interior cylindrical portion of the hub 10. The supports 36 carry outer race rings 40 and 42 for each respective bearings 12 and 14 and include no hub shoulders or raised abutment surfaces to position the bearing outer race rings 40 and 42.

The bearing inner race rings 44 and 46 are tightly, but slidably positioned onto the spindle shaft 18 while the respective outer race rings 40 and 42 are press fit into the hub 10. A spacer sleeve 48 separates the inner race rings 44 and 46 a predetermined distance.

Recessed into the cylindrical inner wall 50 of the hub 10 are grooves 52 and 54 wherein snap rings 56 and 58 are placed to restrain their respective outer races 40 and 42 against outward axial movement. A washer or pressure ring 60 surrounds the shaft 18 and bears against the inner race of bearing 14 as nut 26 is tightened to secure both bearings 12 and 14 in place.

Assembly of the hub 10 onto the spindle 16 is made simpler with the present invention since the assembler can easily determine whether the bearings 12 and 14 are restrained by the sleeve and snap rings or not. To assemble the wheel mounting, the left bearing 12 is first press fit into the hub 10, the spacer 48 then inserted, and the right bearing 14 is then press fit into the hub 10 against the spacer 48 that abuts the bearing 12. The right snap ring 58 is then inserted into its respective groove 54, the hub 10 turned over and the other snap ring 56 inserted into its groove 52. If the spacer 48 is oversize, both snap rings 56 and 58 can not be inserted. If the spacer 48 is undersize, the right bearing 14 will be pressed into the hub 10 too far and the assembler will immediately notice the problem since the snap ring groove 54 will be separated from its respective outer race ring 42 by an excess amount. Since the hub 10 has no shoulder abutments against which the adjacent surfaces of the outer race rings 40 and 42 abut during assembly for positioning, an undersize spacer sleeve 48 will be immediately noticed as the right bearing 14 is pressed into the hub 10 and presses against the spacer 48.

The hub 10 is then slidably mounted onto the spindle shaft 18, the washer 60 and nut 26 positioned on the shaft 18. The nut 26 is then tightened until the left inner race ring 44 abuts the vertical face 24 of the shaft sleeve 20. The pin 62 is then inserted to prevent loosening of the nut 26. The cap 64 is then snapped into place. The pressure exerted on the washer 60 by the nut 26 as it is tightened is not crucial as long as the left bearing inner race 44 abuts the vertical face 24, and the spacer sleeve 48 is tight between the left and right inner race rings 44 and 46. This means of tightening the inner races into relative positions does not distort the inner race track upon which the balls roll as would be a tapered inner race ring if similarly tightened. Accordingly, no periodic torque checks or seasonal tightening of the inner race rings to assure positioning is necessary as would be the case with tapered bearings.

The outer race rings 40 and 42 were positioned during assembly and since they are integral with their respective inner race rings 44 and 46, would present no need to be provided separate positioning structure other than for resisting side loading forces incurred as the disk implement 66 is transported and the wheel 34 skids around a corner. To couple the hub 10 with the bearings 12 and 14 during side loading, the snap rings 56 and 58 bear against the respective outer rings 40 and 42 in opposite axial directions. Each ring 56 and 58 thus transfers to its respective outer race 40 and 42 the side loading forces encountered by the wheel 34 as it and the harrow 66 are skidded around a corner during transport. The integral bearings 12 and 14 resist these loads and prevent the coupled hub 10 from sliding off the outer race rings 40 and 42. With two snap rings 56 and 58 for positioning and maintaining the position of the bearing outer races 40 and 42, each bearing 12 and 14 will counter side loads in one direction only to reduce the frequency with which each bearing outer race 40 and 42 is subjected to side loading forces.

I claim:

1. Means positioning a pair of anti-friction ball bearings on a wheel spindle, each bearing having an inner and outer race ring, comprising: a spacer sleeve supported by the spindle and having opposite ends abutting the axial inner radial faces of the inner race rings; a radial abutment carried by and spaced from one end of said spindle, against which the axial outer radial face of one inner race ring abuts; means axially adjustable and carried by the spindle for bearing against the axial outer radial face of the other inner race ring; a wheel hub having an inner cylindrical wall encasing the bearings and permitting, unless restricted, free axial movement of the bearings, said hub further including axially spaced apart outer race ring support surfaces having respective diameters less than the diameter of said wall, and a pair of removable retaining rings carried by said hub and bearing against the axial outer faces of the outer race rings for restricting axial movement of the latter.

2. An improved wheel mounting comprising: a wheel spindle having a radial abutment spaced from one end thereof; a pair of axially spaced apart anti-friction ball bearings having inner and outer race rings, the former carried on the spindle; a wheel hub mounted on the spindle, having a cylindrical opening surrounding the spindle and having axially spaced apart and radially inwardly extending areas supporting the outer race rings and permitting axial movement of said outer race rings; a spacer sleeve mounted on the spindle and abutting at its opposite ends the adjacent radial faces of the inner race rings; axially adjustable means carried by the spindle for bearing against the outer radial face of one inner race ring and urging said ring and sleeve axially to abut the outer radial face of said other inner race ring against the spindle abutment; and means restricting movement of the outer race rings axially outwardly while permitting movement axially inwardly including a pair of removable retainer rings carried by the hub and bearing against the outer radial faces of the outer race rings.

3. Journal structure between a wheel and a supporting shaft comprising: a hub for said wheel surrounding said shaft and having opposite end portions with internal cylindrical shaped openings and separated by a central portion with an internal opening radially larger than the cylindrical shaped openings; a pair of axially spaced bearings, each having an inner and outer race bearing against the surfaces of the shaft and a respective cylindrical opening; a collar fixedly connected to the shaft and having one end bearing against a radial face on the axial outer side of one of said inner races; a spacer collar carried on the shaft between the bearings and having opposite ends thereof bearing against the opposite radial faces of the respective inner races of the bearings; an annular retaining member bearing against the radial face on the axial outer side of the inner race of the opposite bearing than that which the spacer collar bears; an axially adjustable member on the shaft for axially adjusting the retaining member; a pair of snap rings carried on the end portions of the hub and extending radially inwardly from the surfaces of the respective openings, said snap rings being engageable with the radial surfaces on the outer axial sides of the respective outer races.

4. Means mounting a wheel upon a supporting shaft comprising: a hub for said wheel having an inner cylindrical wall surrounding the shaft, said hub further having axially spaced apart bearing support surfaces extending radially inwardly from said wall; first and second axially spaced bearings, each bearing having an inner and outer race, the outer races carried by respective hub surfaces and the inner races carried by the shaft; a collar carried by the shaft and bearing against the outer radial face of one inner race; a spacer sleeve carried on the shaft between the bearings and bearing at its opposite ends against the adjacent radial faces of said inner races; an annular retaining member bearing against the outer radial face of the other inner race; and means restricting the outer races against axial outward movement, yet permitting axial inward movement composed of retainer rings carried by the hub outwardly of and adjacent the support surfaces and engageable with the outer radial faces of the outer races.

* * * * *